(12) United States Patent
Drake et al.

(10) Patent No.: US 6,888,699 B2
(45) Date of Patent: May 3, 2005

(54) DISC DRIVE CLAMP HAVING CENTERING FEATURES

(75) Inventors: Brenda K. Drake, Louisville, CO (US); Frederick P. Renken, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 419 days.

(21) Appl. No.: 09/938,748

(22) Filed: Aug. 23, 2001

(65) Prior Publication Data

US 2002/0024763 A1 Feb. 28, 2002

Related U.S. Application Data

(60) Provisional application No. 60/227,618, filed on Aug. 23, 2000.

(51) Int. Cl.[7] .............................................. G11B 17/022
(52) U.S. Cl. .................................................. 360/99.12
(58) Field of Search .......................... 360/99.12, 99.05, 360/98.08

(56) References Cited

U.S. PATENT DOCUMENTS

| | | | |
|---|---|---|---|
| 4,864,443 A | * | 9/1989 | Peterson ................... 360/99.12 |
| 5,243,481 A | | 9/1993 | Dunckley et al. ......... 360/99.08 |
| 5,267,106 A | | 11/1993 | Brue et al. ................ 360/98.08 |
| 5,550,690 A | | 8/1996 | Boutaghou et al. ....... 360/99.12 |
| 5,659,443 A | | 8/1997 | Berberich ................. 360/98.06 |
| 5,790,345 A | | 8/1998 | Alt ........................... 360/98.08 |
| 5,790,346 A | * | 8/1998 | Fletcher .................... 360/99.12 |
| 5,805,379 A | * | 9/1998 | Bordes ...................... 360/99.12 |
| 5,822,151 A | | 10/1998 | Albrecht et al. ........... 360/98.08 |
| 5,828,518 A | | 10/1998 | Moir et al. ................ 360/99.12 |
| 5,877,571 A | * | 3/1999 | Brooks ...................... 360/99.12 |
| 5,880,906 A | * | 3/1999 | Lindrose ................... 360/98.08 |
| 6,028,739 A | * | 2/2000 | Lindrose ................... 360/99.12 |
| 6,542,330 B1 | * | 4/2003 | Choo et al. ............... 360/99.12 |
| 6,594,109 B2 | * | 7/2003 | Renken ..................... 360/98.08 |

* cited by examiner

Primary Examiner—Tianjie Chen
(74) Attorney, Agent, or Firm—Fish & Richardson P.C., P.A.

(57) ABSTRACT

A disc clamp having centering features, and a method for centering a disc clamp on a spindle hub within a disc drive utilizes a disc clamp having a series of alignment tabs extending into an inner edge for centering the disc clamp on a motor spindle hub. Each alignment tab has an engagement face that defines a curved or chamfered surface, where the curved surface reduces disc clamp/motor spindle hub interaction when the disc clamp is installed on the spindle hub.

16 Claims, 5 Drawing Sheets

DISC DRIVE CLAMP HAVING CENTERING FEATURES

RELATED APPLICATIONS

This application claims priority of U.S. provisional application Ser. No. 60/227,618, entitled "CLAMP CENTERING FEATURE DESIGN," filed Aug. 23, 2000.

FIELD OF THE INVENTION

This application relates generally to magnetic disc drives and more particularly to a disc drive clamp having centering features for improved disc pack balance.

BACKGROUND OF THE INVENTION

Disc drives are data storage devices that store digital data in magnetic form on a storage medium on a rotating information storage disc. Modern disc drives include one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g., a magnetoresistive read/write head, is used to transfer data between a desired track and an external environment. During a write operation, data is written onto the disc track and during a read operation the head senses the data previously written on the disc track and transfers the information to the external environment.

The heads are mounted via flexures at the ends of a plurality of actuator arms that project radially outward from the actuator body. The actuator body pivots about a shaft mounted to the disc drive housing at a position closely adjacent the outer extreme of the information storage discs. The pivot shaft is parallel with the axis of rotation of the spindle motor and the information storage discs, so that when the actuator arms are pivoted, the heads move in an arc across the surfaces of the information storage discs.

Modern disc drives include one or more information storage discs mounted on the spindle motor. Spacers are typically mounted on the spindle motor between information storage discs to provide adequate separation between the discs for the actuator arms to movably locate the heads in relation with the disc surfaces. The information storage discs and disc spacers are collectively referred to as a disc pack. Typically, the disc pack is secured to the spindle motor hub by a downward clamping force of a disc clamp.

Disc clamps are usually stamped or milled. While milled clamps are more rigid and less prone to deflecting the abutting information storage disc surface, they are relatively expensive to produce. Consequently, the substantially less expensive leaf spring disc clamp, stamped from sheet metal, has become popular, and relatively prominent type of clamp used within the disc drive industry.

The stamped leaf spring disc clamp is typically shaped as a circular disc having a central portion and a rib portion. The central portion of the clamp has a washer-like shape and can be inclined relative to the rib portion. The central portion defines a centrally located aperture for receiving the disc clamp on the spindle hub. The rib portion of the disc clamp is peripherally located for contacting the inner diameter of the top information storage disc. A plurality of screw holes are symmetrically spaced in the central portion about the central aperture of the clamp for receiving screws used to secure the disc clamp to the spindle hub, the torqued screws exerting a downward axial force through the disc clamp and onto the top information storage disc.

A critical functional aspect of the disc clamp, stamped or milled, is how centered the disc clamp is on the disc pack assembly. Un-even or non-centered disc clamps contribute to disc pack imbalances which often result in rotational vibrations within the disc pack assembly. Rotational vibrations cause undesirable variations in the read/write signals detected by the read/write heads, and cause unwanted noise from the disc drive. Additionally, non-centered disc clamps are more prone to offsets during mechanical shock events to the disc drive.

Accordingly, there is a need in the disc drive art for an inexpensive, stamped disc clamp having a centering feature that allows the disc clamp to be centered on the disc pack during installation and use. Against this backdrop the present invention has been developed.

SUMMARY OF THE INVENTION

In one embodiment, the invention is a disc drive spindle motor assembly which includes a cylindrical hub mounted to a spindle shaft, an information storage disc mounted on the cylindrical hub, and a disc clamp for securing the information storage disc to the cylindrical hub. The disc clamp has a web portion and a peripheral ring, where the web portion has an inner edge fitted around the spindle hub. A series of inwardly projecting alignment tabs extend from the inner edge of the web portion to center the disc clamp and information storage disc on the spindle hub. Each inwardly extending tab has a chamfered top edge for reducing contact with the spindle hub during disc clamp installation on the spindle hub.

In another embodiment, the invention is a disc clamp for a disc drive, and includes a web portion having an inner edge, and a peripheral ring that extends below the web portion for contacting a top surface of an information storage disc. The inner edge of the web portion defines a series of equidistantly spaced inwardly extending tabs, where each tab has a chamfered top edge.

These and various other features as well as advantages which characterize the present invention will be apparent from a reading of the following detailed description and a review of the associated drawings.

DETAILED DESCRIPTION

Figure 1:
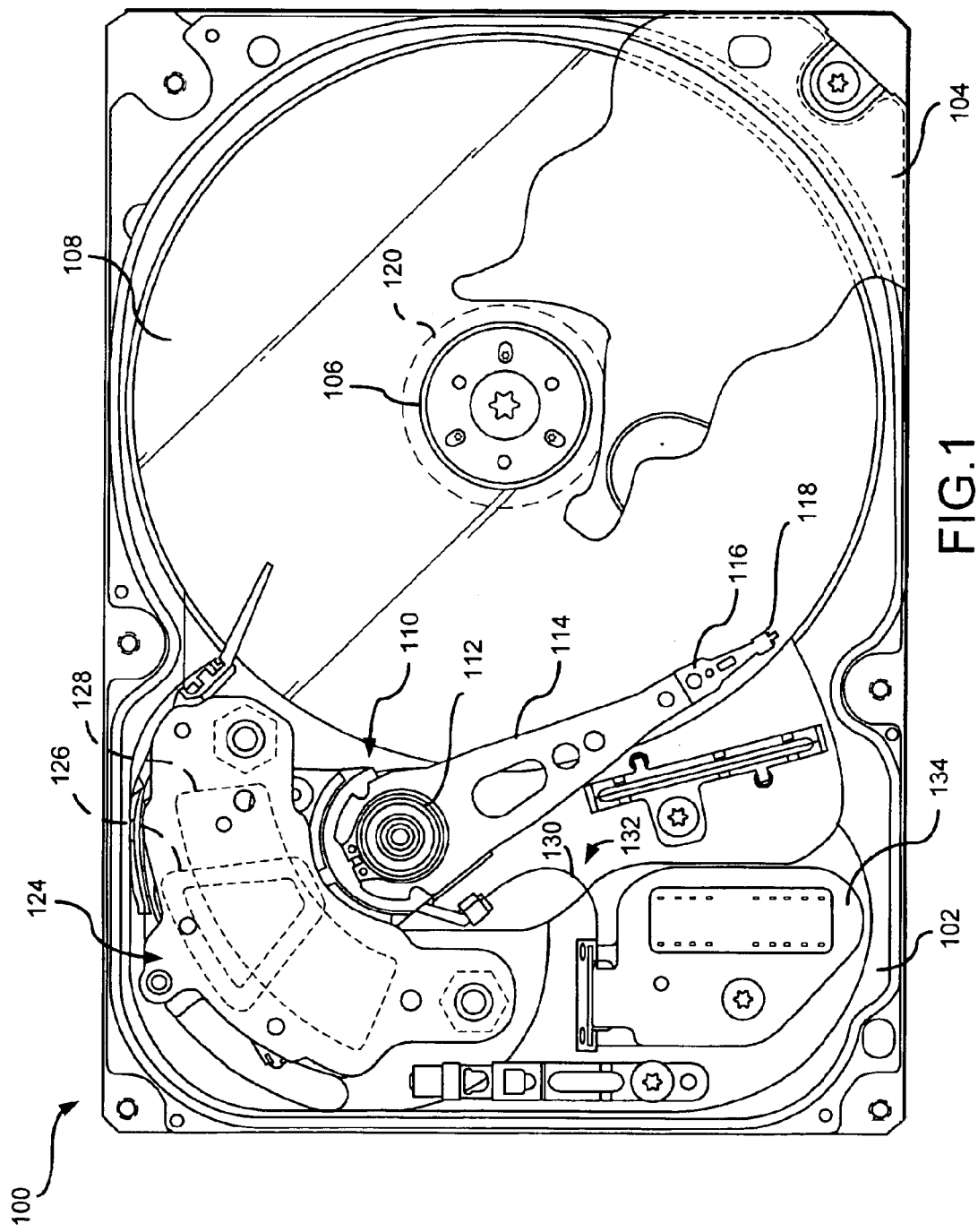
FIG. 1 is a plan view of a disc drive incorporating a preferred embodiment of the present invention and illustrating the primary internal components of the disc drive.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base 102 to form an internal, sealed environment for the disc drive 100 in a conventional manner. The components include a spindle motor 106 which rotates one or more information storage discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider (not shown) enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked. Alternatively, the heads may be moved off of the discs 108 by loading the heads onto a peripherally located load/unload ramp (not shown).

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base plate 102 to a disc drive printed circuit board (not shown) mounted to the bottom side of the disc drive 100.

Figure 2:
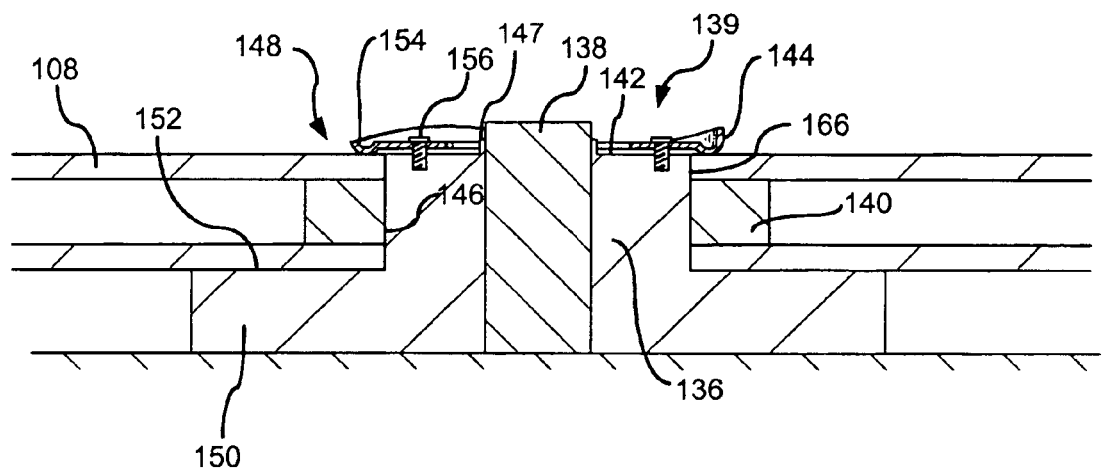
FIG. 2 is a representative cross-sectional view of a disc pack illustrating a disc clamp in accordance with a preferred embodiment of the present invention.

As briefly noted above, one or more information storage discs 108 are mounted on the motor spindle hub 136 of a spindle motor 106, as shown in FIG. 2. A typical spindle motor 106 has a rotating motor hub 136 journaled to a non-rotating spindle shaft 138. The spindle shaft 138 is attached to the base plate 102 and anchors the rotating motor hub 136 within the disc drive 100. The motor spindle hub 136 rotates about the stationary spindle shaft 138 and supports the components of the disc pack 139, i.e., information storage discs 108 and disc spacers 140. (see FIG. 2).

The motor spindle hub 136 has a top surface 142 for receiving a disc clamp 144, a vertically extending side-wall 146 for mounting the disc pack 148, and an annular extending flange 150 having a loading surface 152 for receiving an information storage disc 108. An annular shaped rim or raised location feature 147 extends upwardly from the top surface 142 of the motor spindle hub 136 to assist location and tooling for disc pack assembly.

In one embodiment, an annular disc spacer 140 is stacked on the bottom information storage disc 108. A top information storage disc is stacked on the disc spacer 140. Note that while two information storage discs 108 are shown in FIG. 2, it is envisioned that more than two discs 108 and one corresponding disc spacer 140 may be used with the current invention. Furthermore, the present invention also encompasses the use of a single information storage disc 108 secured between the bottom annular flange 150 and the disc clamp 144, or a single information storage disc 108 secured between a disc spacer 140 and the disc clamp 144.

With continued reference to FIG. 2, a disc clamp 144 in accordance with one embodiment of the present invention is shown sitting around the motor spindle hub 136. A peripheral ring 154 of the disc clamp 144 exerts a downward axial force on the mounted information storage discs 108 and disc spacers 140 which are held in position between the disc clamp 144 and hub flange 150. The disc clamp 144 exerts the downward force through a series of radially positioned screws 156 torqued into the top surface 142 of the motor spindle hub 136.

Figure 3:
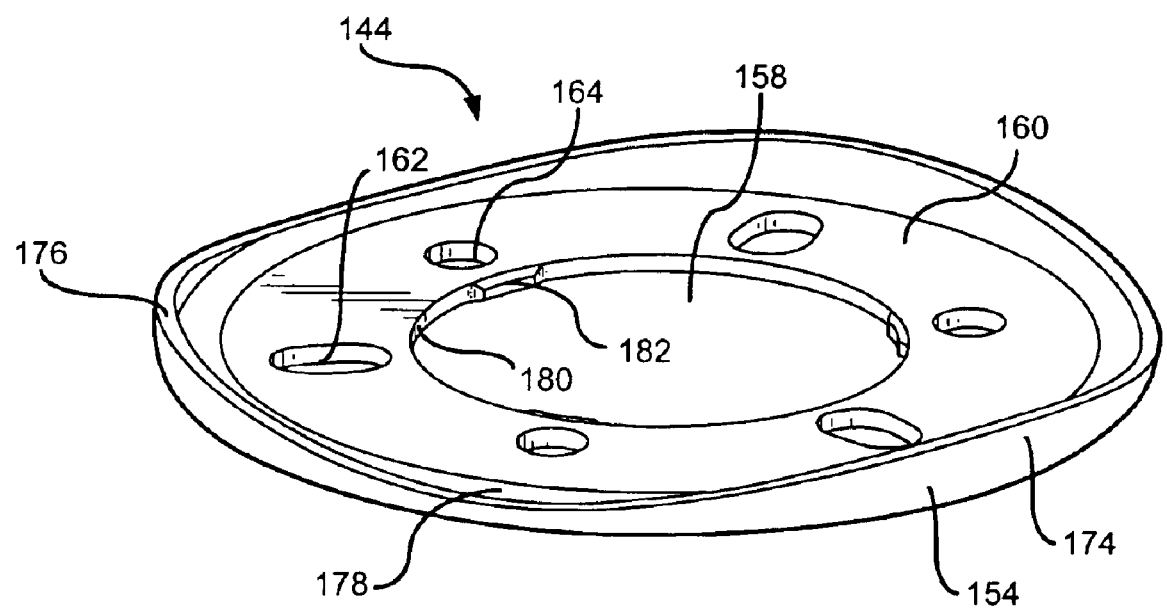
FIG. 3 is an isometric view of a disc clamp in accordance with a preferred embodiment of the present invention.
Figure 4:
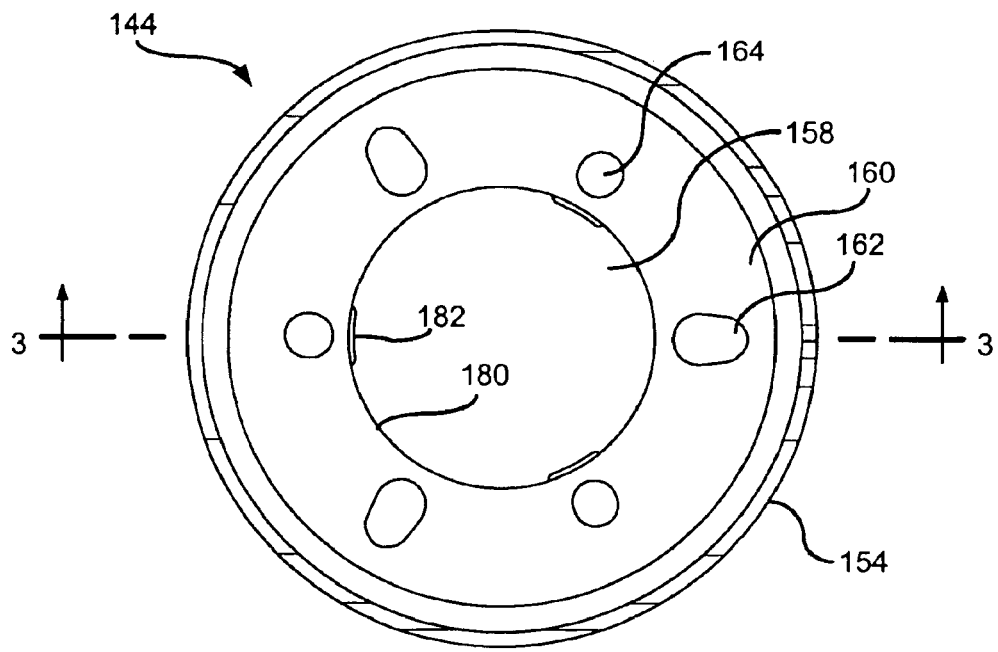
FIG. 4 is a top view of a disc clamp in accordance with a preferred embodiment of the present invention.

FIG. 3 is an isometric view, and FIG. 4 is a top view, of a disc clamp 144 according to a preferred embodiment of the present invention. With reference to FIGS. 3 and 4, and continued reference to FIG. 2, the disc clamp 144 is generally circular or disc-like in shape, having a central aperture 158, a central web portion 160 and a peripheral annular rim 154. The central aperture 158 of the disc clamp 144 sits around the shaped location feature 147 allowing the web portion 160 of the disc clamp 144 to contact and align with the top surface 142 of the motor spindle hub 136. The web portion 160 is flat and not substantially inclined with respect to the top surface 142 of the spindle hub 136. The web portion 160 of the disc clamp 144 extends beyond the outer circumference of the motor spindle hub so that the peripheral annular rim 154 extends downwardly to contact the inner circumference of the top information storage disc 108 (see FIG. 2).

Defined within the web portion 160 of the disc clamp 144 are three screw mounting holes 162 equidistantly spaced around the central aperture 158 of the disc clamp 144. Note, however, that although three screw holes 162 are shown, other embodiments of the disc clamp 144 may have four or more screw holes as long as the holes are equidistantly spaced around the central aperture 158. Each screw hole 162 aligns with a corresponding hole or bore on the top surface of the spindle hub. A screw 156 or other fastening structure is received in each screw mounting hole 162 and corresponding hole in the spindle hub to fasten the disc clamp to the top surface 142 of the motor hub, and consequently exert a downward clamping force onto the disc pack 159. A series of spanner slots 164 are optionally positioned equidistantly between every two screw mounting holes 162.

Peripheral to the web portion 160 is the annular shaped rim portion or ring 154 of the disc clamp 144. As briefly discussed above, when positioned on the spindle hub 136, the rim portion 154 sits beyond the outer surface of the spindle hub 136 and is axially aligned with the inner circumference 166 of the top information storage disc 108. (see FIG. 2)

Figure 5:
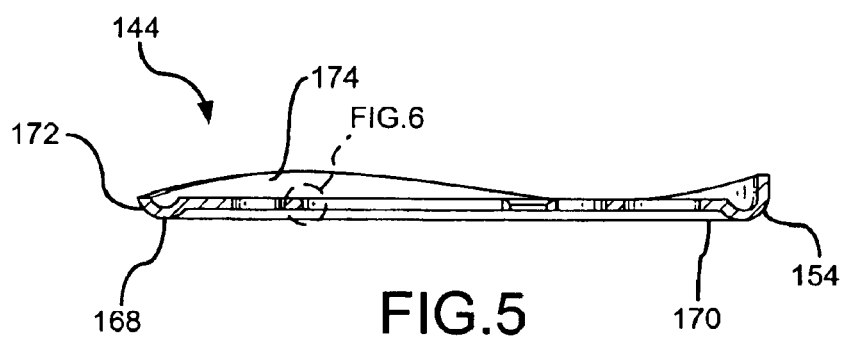
FIG. 5 is a cross-sectional view through the disc clamp taken along line 3—3 in FIG. 4

As shown in FIG. 5, the peripheral rim 154 of the disc clamp has a generally U-shaped cross section, where the bottom 168 of the U defines an information storage disc engagement surface 170 and the peripheral arm 172 of the U forms a series of pressure lobes 174.

In use, the disc clamp 144 is loaded on the motor spindle hub 136, and the information storage disc engagement surface 170 extends below the web portion 160 to form a ring or edge that uniformly engages the top information storage disc. The downward torque of the retaining screws 156 into the top surface 142 of the spindle hub 136 is uniformly translated to a downward axial force through the information storage disc engagement surface 170.

The pressure lobes 174 of the rim portion 154 are uniformly shaped upwardly curved extensions, where the curve peak 176 of each lobe 174 is positioned laterally in-line with the center of each of the screw mounting holes 162, and the curve minimums 178 on either side of a curve maximum 176 are positioned laterally in-line with each spanner slot 164. (see FIG. 3) Each pressure lobe 174 spreads and distributes the force being translated from the torqued clamp retainer screws 156, to the information storage disc.

FIGS. 3–4 illustrates one embodiment of an inner edge 180 that defines the central aperture 158 of the disc clamp 144. A series of protrusions or tabs 182 extend inwardly from the inner edge 180 of the web portion 160. Each tab 182 extends an equidistance away from the inner edge 180 so as to provide a centered series of contact points for engagement of the disc clamp 144 and the rim 147 extending from the top surface of the motor spindle hub 136 (see FIGS. 2 and 7).

Figure 6:
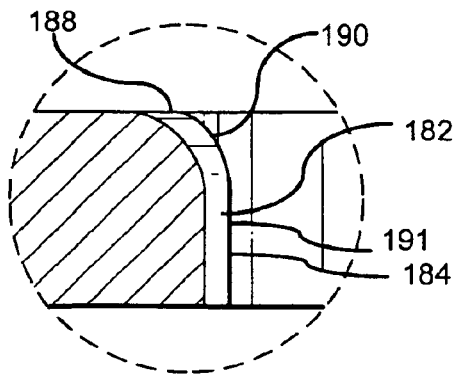
FIG. 6 is an expanded view of the alignment tab shown in the inset of FIG. 5.
Figure 7:
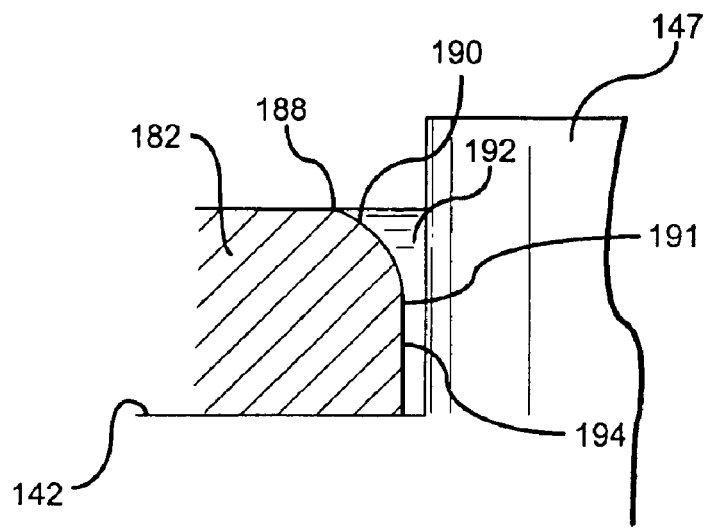
FIG. 7 is a representative cross section view of an alignment tab abutting a raised spindle motor hub in accordance with a preferred embodiment of the present invention.

As illustrated in FIGS. 6 and 7, each alignment tab 182 has a generally cube like shape. The thickness or height of each tab may extend the entire thickness of the inner edge, or in alternative embodiments, may only extend a portion of the thickness of the inner edge 180. In one embodiment, the tabs 182 are laterally aligned with the center of each spanner slot 164, but note that the tabs may also be laterally aligned with the center of each screw mounting hole 162 (see also FIG. 4).

Each alignment tab has an inwardly facing engagement face 184 for receiving the rim 147 of the motor spindle hub 136. The engagement face 184 has a top curved portion 190 and a lower straight portion 191. The rounded/curved 190 or chamfered portion of the engagement face 184 provides a recess or gap 192 along the top edge of the tab 182, so that when the disc clamp 144 is secured downwardly onto the top surface of the motor spindle hub 136, the front engagement face 184 of the alignment tab 182 translates along the rim 147 of the motor spindle hub 136 without interfering with the rim 147, as is discussed in more detail below.

In use, the disc clamp 144 is positioned around the spindle hub 136 allowing the web portion 160 of the disc clamp to seat against the top surface 142 of the spindle hub 136. The lower portion 191 of the spindle shaft engagement surface 184 of the alignment tabs 182 are substantially parallel to the cylindrical wall 194 of the rim portion 147 of the motor spindle hub 136. (see FIG. 7). As the retainer screws 156 are torqued into the top surface 142 of the motor spindle hub 136, the web portion 160 is pressed downwardly against the top surface 142 of the motor spindle hub 136. The downward force is transmitted outwardly from each screw hole 162 in the disc clamp 144 to force the peripheral annular ring downward onto the top surface of the top information storage disc and therefore onto the disc pack. The action of the disc clamp 144 exerting a clamping force on the disc pack forces the inner edge 180 of the disc clamp 144 to rotate downwardly and away from the rim 147 of the motor spindle hub 136. As the inner edge 180 of the web portion 160 is forced downward, each alignment tab 182 is rotated, to some extent, below the surface of the web portion 160 and away from the cylindrical wall 194 of the rim 147 of the motor spindle hub 136. The curved face 190 on each tab 182 ensures that the spindle shaft engagement face 184 of the tab 182 does not contact the cylindrical wall 194 of the rim portion 147 of the motor spindle hub 136, keeping the disc clamp 144 centered around the spindle shaft 138 and motor spindle hub 136 and avoiding any debris formation from contact between the disc clamp 144 and the motor spindle hub 136.

Figure 8:
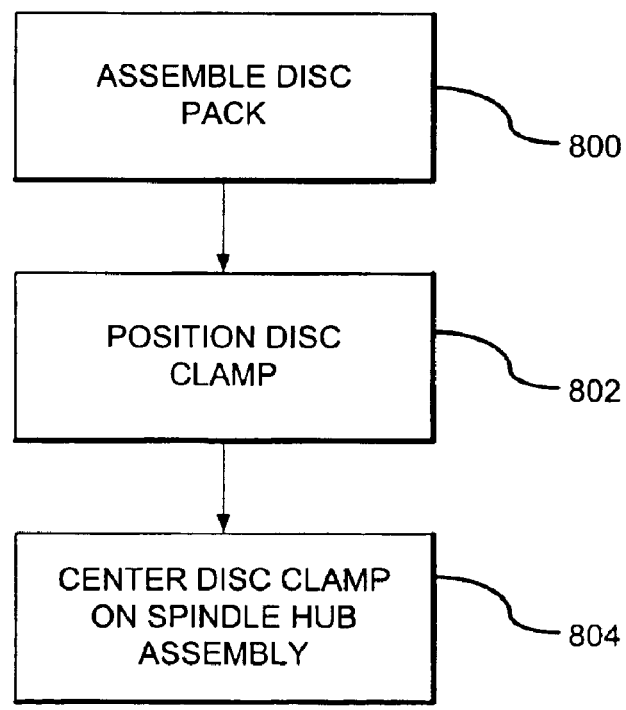
FIG. 8 is a process flow diagram for centering a disc clamp on a motor hub assembly in conformity with one embodiment of the present invention.

An embodiment of the present invention is a method for centering a disc clamp on a motor spindle hub, as shown in FIG. 8. In operation 800, a disc pack 139 is assembled on the motor spindle hub 136 of the disc drive spindle motor 106. In operation 802, the disc clamp 144 is positioned over the rim 147 and on the top surface 142 of the motor spindle hub 136 so that the alignment tabs 182 align with the cylindrical wall of the rim 147 and center the disc clamp 144 on the disc pack. In operation 804, the appropriate number of screws 156 are used to secure the disc clamp 144 to the motor spindle hub 136. As the screws are torqued into the motor spindle hub, the alignment tabs along the inside edge of the disc clamp 144 move downward and away from the cylindrical wall 194 of the rim portion 147 of the motor spindle hub 136, as the curved face 190 of each alignment tab 182 translates along the surface of the cylindrical wall of the motor spindle hub rim.

Note, it is envisioned that embodiments of the present invention may be used with other spindle motor designs. For example, spindle motors having a spindle shaft and motor spindle hub that both rotate about a bearing sleeve. In this case, alignment tabs extending inwardly from the inner edge of the web portion would align along the cylindrical surface of the spindle shaft, but operate in the manner previously described above.

In summary, the preferred embodiment of the invention described herein is directed to a disc drive spindle motor assembly (such as 106) having a centered disc pack (such as 159). The disc drive spindle motor assembly has a cylindrical hub (such as 136) mounted to a spindle shaft (such as 138); an information storage disc (such as 108) mounted on the cylindrical hub (such as 136); and a disc clamp (such as 144) having a central aperture (such as 158), a web portion (such as 160) and an annular ring (such as 154). The web portion (such as 160) of the disc clamp (such as 144) is fitted over the spindle hub rim (such as 147) to align a series of inwardly extending tabs (such as 182) from an inner edge (such as 180) of the web portion (such as 160) with an upwardly extending rim (such as 147) from the top surface of the motor spindle hub (such as 136). Each tab (such as 182) has a chamfered top edge (such as 190) for reduced contact with the motor spindle hub during disc clamp installation on the motor spindle hub (such as 136).

In other preferred embodiments of the present invention, the tabs are located equidistant from each other around the inner edge (such as 180) of the web portion (such as 160) of the disc clamp (such as 144). In a preferred embodiment, there are three tabs.

In another preferred embodiment of the invention, the disc clamp (such as 144) is stamped from stainless steel sheet metal.

In another preferred embodiment of the invention, the disc clamp has a series of pressure lobes (such as 174) extending from the peripherally located ring (such as 154) for spreading the downward force associated with disc clamp installation on the spindle hub.

In another preferred embodiment of the invention, the disc clamp has an equal number of screw holes (such as 162) for securing the disc clamp to the cylindrical hub as tabs (such as 180).

A further preferred embodiment of the invention described herein is directed to a disc clamp for securing an information storage disc to a cylindrical hub. The disc clamp has a web portion (such as 160) having an inner edge (such as 180) that surrounds a central aperture (such as 158), where the inner edge has a series of inwardly extending tabs (such as 180) equidistantly spaced around the inner edge, each tab having a curved or chamfered top edge (such as 190), and a peripheral annular ring portion (such as 168) extending below the web portion (such as 160) for contacting a top surface on an information storage disc (such as 108). In some embodiments there are three tabs (such as 180).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A disc drive spindle motor assembly comprising:
   a cylindrical motor spindle hub having an upwardly extending rim, the cylindrical motor spindle hub mounted to a spindle shaft;
   an information storage disc mounted on the cylindrical motor spindle hub; and
   an annular disc clamp securing the information storage disc to the cylindrical motor spindle hub, the clamp having an annular web portion with a series of inwardly extending tabs fitted around the rim to center the disc clamp on the cylindrical motor spindle hub, the tabs projecting from an inner edge of the web portion toward the rim, wherein each tab has a rounded top edge such that radial separation between each tab and an upwardly extending surface of the rim increases as the web portion of the disc clamp is being secured to a radially extending surface of the cylindrical motor spindle hub.

2. The disc drive spindle motor assembly of claim 1 wherein the tabs are located equidistant from each other around the inner edge of the web portion of the disc clamp.

3. The disc drive spindle motor assembly of claim 2 wherein there are three tabs.

4. The disc drive spindle motor assembly of claim 1 wherein the disc clamp is stamped from sheet metal.

5. The disc drive spindle motor assembly of claim 1 wherein the disc clamp has a series of upwardly extending pressure lobes located from a peripherally located ring, the pressure lobes for spreading the downward force on the information storage disc by the disc clamp.

6. The disc drive spindle motor assembly of claim 1 wherein the web portion and the top surface of the spindle hub each define a series of equidistantly spaced screw holes for receiving a series of screws to secure the disc clamp to the spindle hub, wherein the number of screw holes is equal to the number of tabs in the web portion.

7. The disc drive spindle motor assembly of claim 6 wherein the tabs and screw holes in the web portion of the disc clamp are substantially laterally aligned.

8. The disc drive spindle motor assembly of claim 1 wherein the inner edge of the web portion moves downward and away from the spindle shaft during installation.

9. A disc clamp for securing an information storage disc to a motor spindle hub in a disc drive, the disc clamp comprising:
   a web portion having an inner edge with a series of equidistantly spaced inwardly extending tabs, each tab having a chamfered top edge; and
   a peripheral ring portion for contacting a top surface of an information storage disc
   wherein the radial separation between the chamfered top edge of each tab and an unwardly extending surface of the motor spindle hub increases as the web portion is being secured to the motor spindle hub.

10. The disc clamp of claim 9 wherein the inner edge has three equidistantly spaced tabs.

11. The disc clamp of claim 9 wherein the disc clamp is stamped from sheet metal.

12. The disc clamp of claim 9 further comprises a series of upwardly extending pressure lobes peripherally located from the annular ring, the pressure lobes for spreading downward force on the information storage disc during disc clamp installation on the cylindrical hub.

13. The disc clamp of claim 9 wherein the web portion is substantially parallel to the top surface of the information storage disc.

14. A disc drive spindle motor assembly comprising:
   an information storage disc mounted on a cylindrical hub; and
   means for providing a uniform and centered clamping force to a top surface of the information storage disc.

15. The disc drive spindle motor assembly of claim 14 wherein the means is a disc clamp having a web portion with a central aperture lined by an inner edge having a series of inwardly extending alignment tabs equidistantly spaced around the inner edge.

16. The disc drive spindle motor assembly of claim 15 wherein each alignment tab has a spindle shaft engagement surface and a chamfered edge.

* * * * *